(12) United States Patent
Wall et al.

(10) Patent No.: US 6,959,362 B2
(45) Date of Patent: Oct. 25, 2005

(54) CACHING BASED ON ACCESS RIGHTS IN CONNECTION WITH A CONTENT MANAGEMENT SERVER SYSTEM OR THE LIKE

(75) Inventors: Larry Marvin Wall, Redmond, WA (US); Glen Buhlmann, Kirkland, WA (US); Nicholas Duncan, Redmond, WA (US); Kristof Roomp, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 351 days.

(21) Appl. No.: 10/431,408

(22) Filed: May 7, 2003

(65) Prior Publication Data

US 2004/0225848 A1 Nov. 11, 2004

(51) Int. Cl.⁷ .............................................. G06F 12/14
(52) U.S. Cl. ...................................................... 711/130
(58) Field of Search ................. 711/118, 130; 709/217

(56) References Cited

U.S. PATENT DOCUMENTS

| | | | |
|---|---|---|---|
| 5,941,947 A * | 8/1999 | Brown et al. ................ | 709/225 |
| 6,330,572 B1 * | 12/2001 | Sitka .......................... | 707/205 |
| 2003/0061278 A1 * | 3/2003 | Agarwalla et al. .......... | 709/203 |

OTHER PUBLICATIONS

Ahuja, S. et al., "Cache on Demand", *Proceedings 2002 IEEE International Conference on Multimedia and Expo*, 2002, 2, 41-44.
Buchholz, S. et al., "Web Caching in a Pervasive Computing World", 6th *World Multiconference on Systemics, Cybernetics and Informatics. Proceedings*, 2002, 4, 102-107.
Padmanabhan, VN., "The Content and Access Dynamics of a Busy Web Site: Findings and Implications", *Computer Communication Review*, 2000, 30(4), 111-123.
Xu, J. et al., "Caching and Prefetching for Web Content Distribution", *Computing in Science and Engineering*, 2004, 6(4), 54-59.

* cited by examiner

*Primary Examiner*—Kevin L. Ellis
(74) *Attorney, Agent, or Firm*—Woodcock Washburn LLP (57) ABSTRACT

Data is served from a data source to a user by way of an interface having a cache. The data source has a plurality of pre-defined user groups. The interface receives a request from the user for the data from the data source and requests the data source to provide a cache key corresponding to the requesting user. The data source generates the cache key for the requesting user based on a set of the user groups of such user and returns the generated cache key to the interface. The generated cache key represents exact access rights for the user based on the set of the user groups of the user. The interface thereafter determines whether any data that satisfies the request is stored in the cache with the generated cache key.

19 Claims, 4 Drawing Sheets

CACHING BASED ON ACCESS RIGHTS IN CONNECTION WITH A CONTENT MANAGEMENT SERVER SYSTEM OR THE LIKE

TECHNICAL FIELD

The present invention relates to a content management server system or the like that caches pages or the like to be served. More specifically, the present invention relates to such content management server system or the like that caches pages or the like based on user access rights.

BACKGROUND OF THE INVENTION

As may be appreciated, a content management server (CMS) is employed by an enterprise or organization to build, deploy, and maintain a content-rich web site such as that which may be accessible by way of the Internet or another network. Such a CMS streamlines the web publishing process, thereby reducing costly site maintenance and empowering the enterprise or organization to manage its own content. An example of such a CMS is provided by the MICROSOFT Content Management Server application, as developed and marketed by MICROSOFT Corporation of Redmond, Wash., USA.

Thus, a CMS is employed to deploy an Internet, intranet, or extranet web site, and provides tools necessary to build and deploy the core infrastructure of a web site, including site structure, presentation templates, site design, application integration, and security. In addition, once a site has been deployed, managers and content authors can use CMS tools to create, publish, and manage their own content.

Typically, a CMS provides content managers, authors, and the like with tools that enable such personnel to create and publish rich, personalized content directly to a web site. A role-based distributed publishing model is typically employed, where such model incorporates an approval workflow with multiple levels, automatic content scheduling and archiving, and content indexing. Developers can create centrally-managed page templates and publishing processes that ensure consistency across the site, thus ensuring adherence to organizational publishing standards and branding without diminishing the flexibility of the publishing environment.

As may be appreciated, in response to each request for a page, the CMS may serve the page dynamically by freshly generating the page based on information already present in an associated data base and/or information available from other sources (i.e., 'from scratch'), and then serving the generated page in response to the request therefor. However, and as should also be appreciated, generating each page from scratch is relatively expensive in terms of execution time, processor availability, network bandwidth, and the like.

Accordingly, and as is known, in response to a first request for a page, the CMS may generate the page from scratch, serve such generated page, and also cache such generated page and/or portions thereof, and in response to a second request for a page, the CMS may merely retrieve the cached page and/or portions thereof and serve same.

However, and significantly, it is to be appreciated that the same page may contain subtle or even non-subtle variations as between two requests therefor. For example, in a first variation for a first user or group of users, the page may have a first header, and in a second variation for a second user or group of users, the page may have a second header. Of course, variations may occur in many other page features, including the body of the page, the footer of the page, particular sections to appear in the page, etc. The reasons for the variations are many, but examples of such reasons include the user having a particular browser, the user being in a particular geographic location, the request being made at a particular time, and most significantly with regard to the present invention, the user having particular user rights with regard to viewing the page, among others.

Thus, caching a particular page may actually require caching each of the multiple variations of the page and/or portions thereof. Note, though, that in the course of caching every one of the multiple variations of the page and/or portions thereof, it should not be the case that such caching is performed with too fine a granularity. That is, if a page as cached is really unique to only one or only a few users, then the CMS will have to generate and cache the page an overly large number of times, especially if there are many requesting users. Of course, such over-generating and over-caching defeats the purpose of having the cache in the first place.

Correspondingly, it should not be the case that such caching is performed with too course a granularity. That is, if a page as cached is common to many users, then the page as generated and cached by the CMS must be amenable to all of such users. However, such an amenable page is likely too overbroad or generalized to be of much use to any particular user.

A need exists, then, for a method and mechanism for caching a page based on an appropriate granularity. In particular, a need exists for such a method and mechanism that caches based on one or more attributes by which the page may vary. Even more particularly, a need exists for such a method and mechanism that caches based on the rights a user has with regard to a page, whereby such rights are exemplified by membership of the user in one or more user groups.

SUMMARY OF THE INVENTION

The aforementioned needs are satisfied at least in part by the present invention in which a method is provided for serving data from a data source to a user by way of an interface having a cache. The data source has a plurality of pre-defined user groups.

In the method, the interface receives a request from the user for the data from the data source and requests the data source to provide a cache key corresponding to the requesting user. The data source generates the cache key for the requesting user based on a set of the user groups of such user and returns the generated cache key to the interface. Significantly, the generated cache key represents exact access rights for the user based on the set of the user groups of the user. The interface thereafter determines whether any data that satisfies the request is stored in the cache with the generated cache key.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 1:
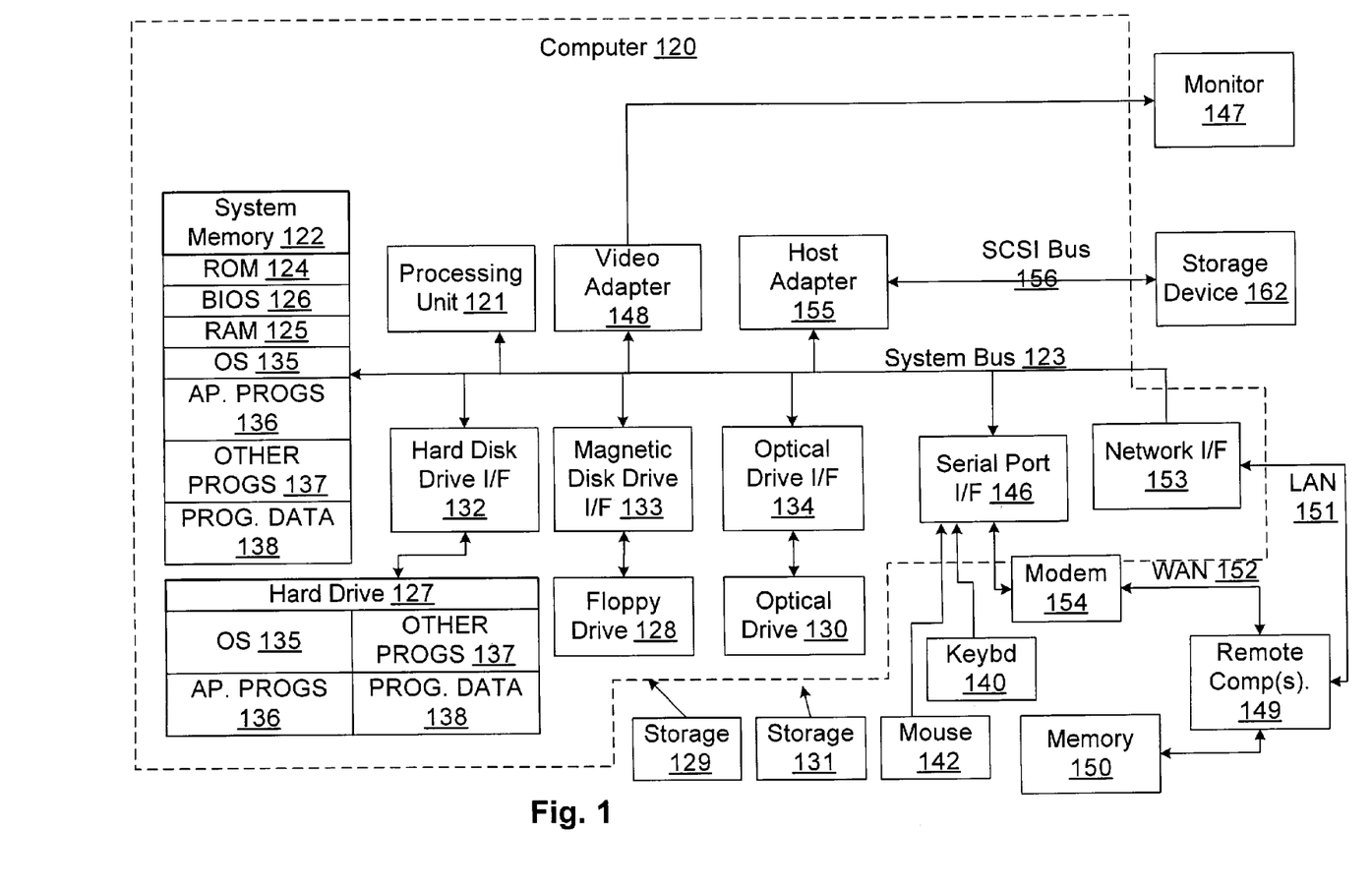
FIG. 1 is a block diagram representing a general purpose computer system in which aspects of the present invention and/or portions thereof may be incorporated.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, mini-computers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 1 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet. The personal computer 120 may also act as a host to a guest such as another personal computer 120, a more specialized device such as a portable player or portable data assistant, or the like, whereby the host downloads data to and/or uploads data from the guest, among other things.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Content Management Server System Overview

Figure 2:
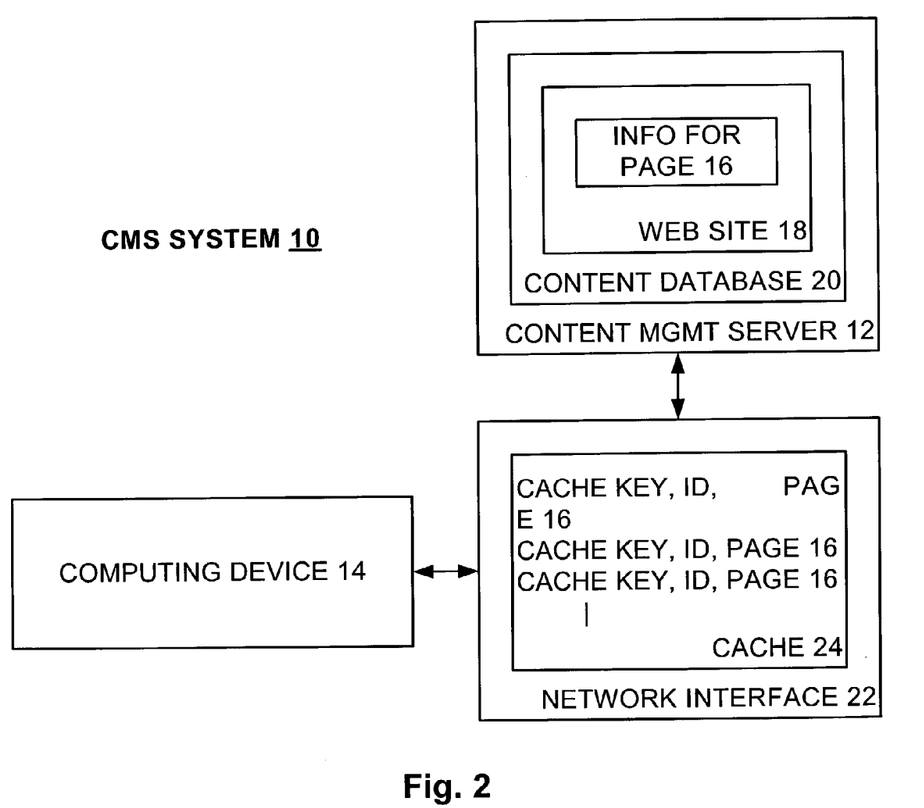
FIG. 2 is block diagram showing a content management server (CMS) system including a CMS and a network interface with a cache in accordance with one embodiment of the present invention.

In one embodiment of the present invention, and turning now to FIG. 2, a Content Management Server (CMS) system 10 includes a CMS 12 and a plurality of users each at a client computing device 14 in operative communication with the CMS 12 by way of a network such as the Internet, an Intranet, or the like. Thus, each user at a computing device 14 can by way of an appropriate browser or the like thereon request a page 16 be served by the CMS 12.

The page 16 may have any content therein without departing from the spirit and scope of the present invention, although it is to be understood that the user is normally requesting the page 16 in the context of a web site 18 hosted by the CMS 12. For example, if the web site 18 is an electronic storefront, the page 16 may relate to an item available for sale thereat. Likewise, if the web site 18 is a support site, the page 16 may be a knowledge base article.

The computing device 14 may be any appropriate one without departing from the spirit and scope of the present invention, presuming that such computing device 14 and the browser thereon provides the functionality required by the user to in fact request page 16 and receive same for viewing by the user thereat. Notably, although the CMS 12 likely serves the page 16 in a format such as Hyper Text Markup Language (HTML) or eXtensible Markup Language (XML) or variations thereon, the CMS 12 need not necessarily produce the page 16 in such format.

The CMS 12 itself may be any appropriate CMS without departing from the spirit and scope of the present invention. For example, the CMS 12 may be a MICROSOFT CONTENT MANAGEMENT SERVER as developed and marketed by MICROSOFT Corporation of Redmond, Wash., USA. Inasmuch as the CMS 12 is known or should be apparent to the relevant public, such CMS 12 need not be described in detail herein except as set forth. Note that although the present invention of caching is disclosed primarily in terms of the CMS system 10 and CMS 12, the present invention may also be incorporated into any other type of caching system without departing from the spirit and scope of the present invention.

Typically, such CMS 12 includes a content database 20 within which is stored information on how to generate pages 16 or portions thereof to be served by such CMS 12 in the course of hosting the web site 18. Also typically, the CMS 12 works with a network interface 22 by which the CMS 12 receives requests for such pages 16 from users at computing devices 14 and returns such pages 16 in response thereto. As may be appreciated, the network interface 22 handles basic network communications, and also can perform functionality necessary to receive a request, authenticate the request, authorize the received request with the CMS 12, forward the authorized request to the CMS 12, receive a served page 16 from the CMS 12, perform post serve handling, and the like.

The network interface 22 itself may be any appropriate interface without departing from the spirit and scope of the present invention. For example, the network interface 22 may be based on MICROSOFT ASP.NET HTTP runtime software as developed and marketed by MICROSOFT Corporation of Redmond, Wash., USA. Inasmuch as the network interface 22 is known or should be apparent to the relevant public, such network interface 22 need not be described in detail herein except as set forth.

As may be appreciated, page generation information for each page 16 within the content database 20 of the CMS 18 is stored with a pre-defined address such as a Universal Resource Locator (URL). Accordingly, a page 16 may be requested based on such URL and generation information therefor may be located within the content database 20 based on such URL. As may also be appreciated, each page 16 may comprise multiple portions, generation information for each being separately stored in the content database 20.

As was alluded to above, the CMS 12 and/or the network interface 22 may also include a cache 24 within which is stored generated pages 16 or portions thereof for faster and more economical serving to a requesting user. Thus, if a page 16 or portion thereof as requested from the CMS 12 is already in the cache 24, the CMS 12 need not go to the content database 20 for generation information for generating such page 16 or portion thereof, at least under certain circumstances. Instead, under such certain circumstances, the CMS 12 or the network interface 22 need only retrieve the generated page 16 or portion thereof from the cache 24 and then serve same.

Typically, each cached page 16 or portion thereof is stored in the cache 24 according to a cache identifier unique to the page 16 or portion thereof. For example, in the case of a whole page 16, the cache identifier may be an identifier for the page 16 such as a URL or some other page ID. Likewise, in the case of a portion of a page 16, the cache identifier may be the aforementioned identifier for the page 16 and also an identifier for the portion of the page 16.

Caching Based on User Access Rights

In the present invention, each page 16 as served by the CMS 12 is cached based on the access rights a user has with regard to the page 16, whereby such access rights are exemplified by assignment of the user to one or more user roles, by membership of the user in one or more user groups, or the like. Thus, the user must be authenticated to the CMS 12, which may be done automatically or by way of a log-in process or the like. For example, in the case where the user is anonymously or semi-anonymously browsing a web site 18 hosted by the CMS 12 (i.e., without being required to go through a log-in procedure, or without being required to positively identify oneself, such user may be automatically authenticated to the CMS 12 in some relatively low-level status such as 'guest'. Correspondingly, in the case where the user is an administrator or author or designer for the web site 18, such user may be logged in to the CMS 12 in some relatively high-level status such as 'administrator' or 'power user'. Thus, each user may be characterized to the CMS 12 according to a role the user plays with regard to the CMS 12. Moreover, each user may be conferred multiple roles with regard to the CMS 12.

Such user may also be characterized to the CMS 12 in any other manner without departing from the spirit and scope of the present invention. For example, and especially in the case of users within an organization, each user may belong to one or more groups pre-defined within the organization. Thus, each user may be characterized to the CMS 12 according to one or more groups the user belongs to within the organization. Of course, to do so, a directory or the like should be maintained to reflect all users and groups within the organization, and the CMS 12 should have access to such directory.

In one embodiment of the present invention, the CMS 12 in response to a request from a user at a computing device 14 serves dynamic content to the user by way of an appropriate page 16. However, and as was set forth above, generating the dynamic content on the page 16 is an expensive operation, and accordingly should be minimized. Thus, in the embodiment, each page 16 or portion thereof if not already present in the cache 24 is so cached. In particular, the CMS 12 or network interface 22 caches the generated page 16 or portion thereof (hereinafter, "page 16") in the cache 24 as rendered HTML/XML, which is then available to be served when another user makes an 'equivalent' request that would result in the same rendered HTML/XML.

However, and significantly, 'equivalent' is difficult to define, especially without making the granularity of caching too fine. In one embodiment of the present invention, two requests are 'equivalent' if each request is for the same page 16, and also if each request is made by a user with the exact same access rights with regard to the CMS 12, where each access right is defined by a user being in a particular user group, user role, or the like (hereinafter, "user group"). Note, though, that such a definition does not merely require the CMS 12 to cache the rendered content for a page 16 in the cache 24 and then assume that any user who has access rights to that page 16 can be served same from the cache 24. In particular, it may be that the rendered page 16 contains links or references to other pages 16 within the web site 18, where the links could be different for users who have different access rights. Likewise, it may be that the rendered page 16 contains varying portions thereof that could be different for users who have different access rights.

Similarly, for a page 16 that can only be accessed by a user having a higher-level access right (i.e., from a higher-level user group), it may be that a first user having the higher-level access right and a lower-level access right (i.e., from a lower-level user group) accesses the page 16 based on the higher-access right. Thereafter, the CMS 12 must not allow a second user having only the lower-access right to access the page 16 by way of the cache 24. Thus, the CMS 12 or network interface 22 cannot cache the page 16 based on the first user having the higher-level access right and the lower-level access right, and then allow another user to access the cached page 16 if such user has either the higher-level access right or the lower-level access right. Likewise, the CMS 12 or network interface 22 likely is not capable of discerning that the first user accessed the page 16 based on the higher-level access right, and then caching the page 16 based only on such higher-level access right.

Instead, and again, in one embodiment of the present invention, the CMS 12 or network interface 22 caches the page 16 in the cache 24 based on the first user having the higher-level access right and the lower-level access right, and allows another user to access the cached page 16 from the cache 24 only if such another user has the exact same access rights with regard to the CMS 12, i.e., both the higher-level access right and the lower-level access right. Although it is to be appreciated that such a caching approach has a finer granularity than if the CMS 12 or network interface 22 could actually discern the particular level of a user that actually should be employed as the basis for caching, it has been found at least empirically that caching and retrieving based on exact same access rights results in acceptable use of the cache 24 and acceptable costs expended in generating pages 16 based on generating information in the content database 20.

Note that in the present invention, exact same access rights is only one 'filter' by which pages 16 may be cached. In addition to exact same access rights, other filters may also be employed without departing from the spirit and scope of the present invention. For example, such other filters by which a page may be cached include one or more attributes of the request for the page 16, one or more attributes of a query string within the request for the page 16, the browser of the user, combinations thereof, and the like.

Figure 3A:
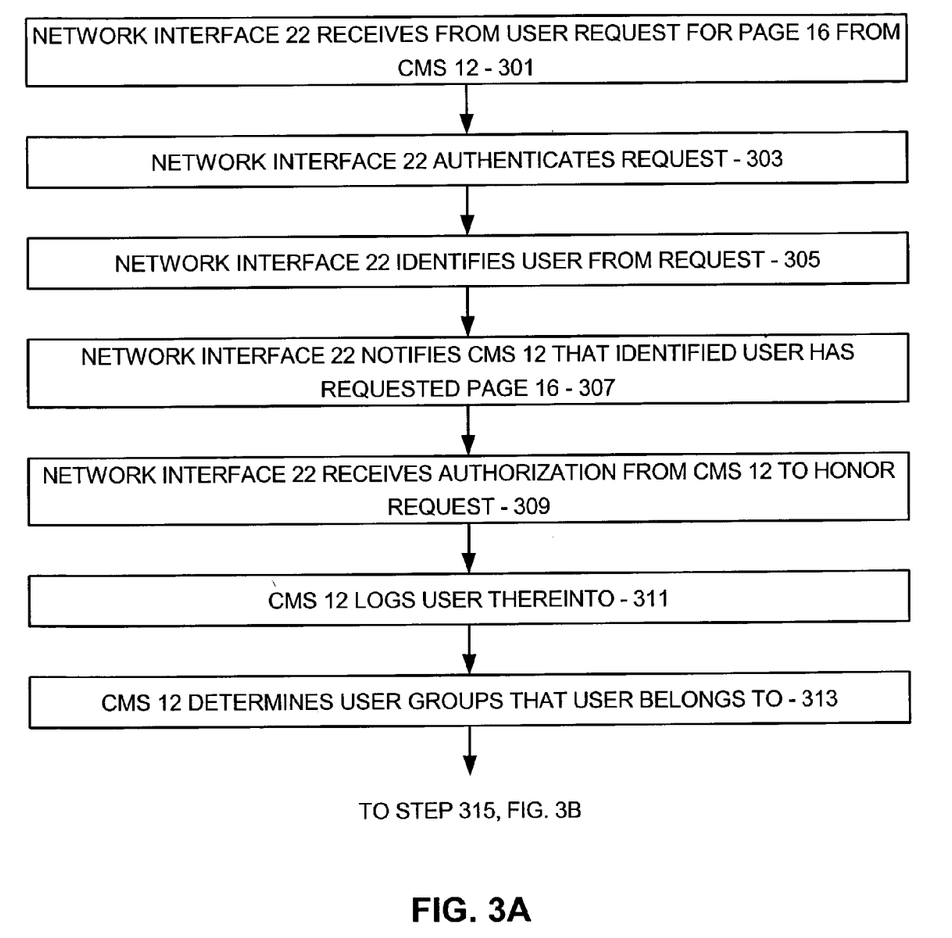
FIGS. 3A and 3B are flow diagram showing key steps performed by the network interface and CMS of FIG. 2 in retrieving a requested page from either the CMS or the cache in accordance with one embodiment of the present invention.
Figure 3B:
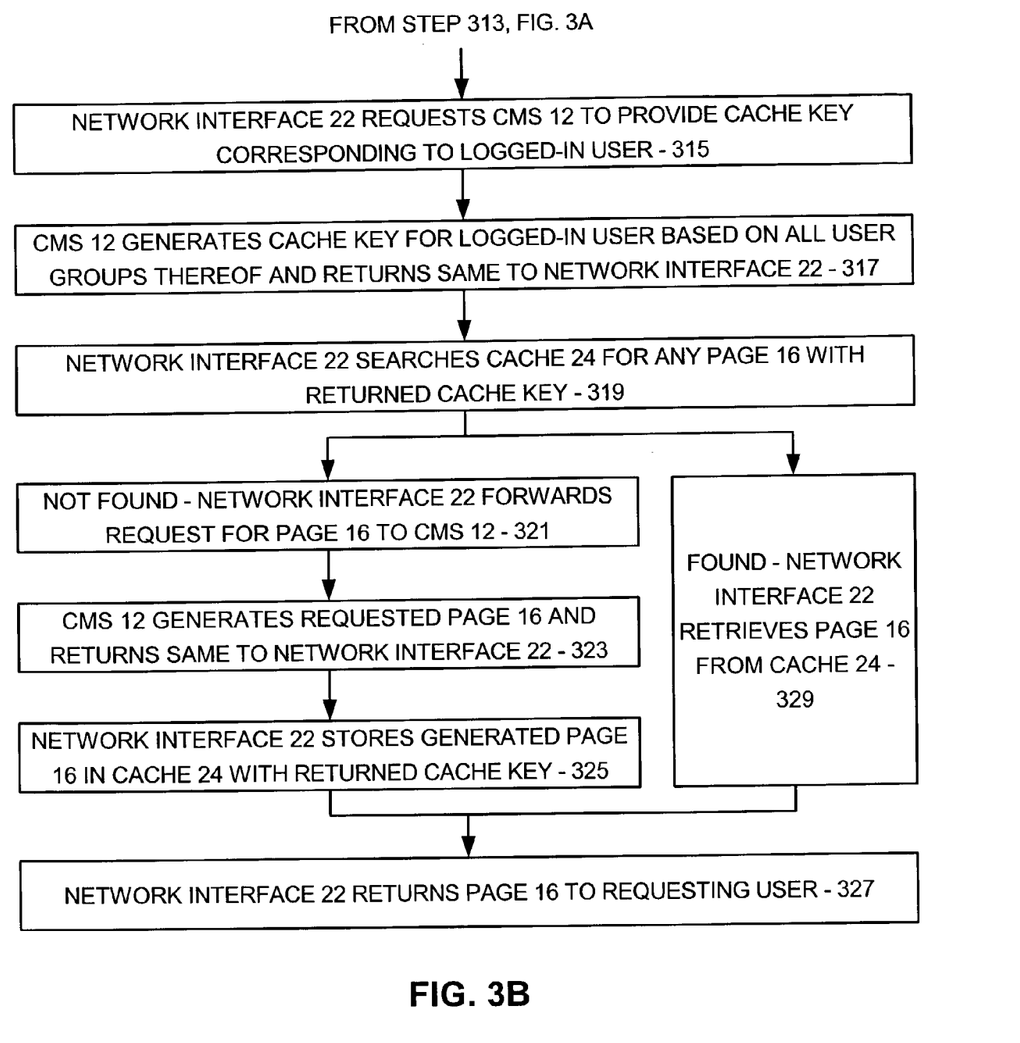

Turning now to FIGS. 3A and 3B, a method is set forth for caching a page 16 in the cache 24 by way of exact same access rights as defined by user groups. Preliminarily, it is seen that the network interface 22 receives a request from a user for a page 16 from the CMS 12 (step 301). In response to the request, the network interface 22 may perform preliminary functions such as authenticating the request (step 303) and determining in conjunction with the CMS 12 that the user is authorized to make the request for the page 16. With regard to the latter, such authorizing occurs by way of the network interface 22 identifying the user from the request (step 305), notifying the CMS 12 that the identified user has requested the page 16 (step 307), and receiving authorization from the CMS 12 to honor the request for the page 16 (step 309). In doing so, it is to be appreciated that the CMS 12 logs the user thereinto (step 311), and determines from an appropriate directory or the like the user groups that the user belongs to (step 313). As may be appreciated, the CMS 12 in authorizing the request for the page 16 locates access rights specified for the page 16 and determines based on the user groups that the user belongs to whether such user indeed satisfies such access rights for the page 16. As should also be appreciated, each such user group corresponds to an access right.

Upon the network interface 22 receiving authorization from the CMS 12 to honor the request as at step 309, and in one embodiment of the present invention, the network interface 22 requests that the CMS 12 provide a cache key corresponding to the logged-in user (step 315), where the cache key represents the exact access rights for the user based on the user groups of the user. Note that such cache key is likely not a cryptographic key, but instead is to be employed as an index mechanism for determining whether the page 16 is cached in the cache 24, as will be set forth below. In response, the CMS 12 in fact generates the cache key for the logged-in user based on all of the user groups of such user and returns same to the network interface 22 (step 317).

In one embodiment of the present invention, each user group of the user has an identifier, and the cache key represents all of the identifiers of the user groups of the user concatenated into a composite identifier. Of course, the concatenation should be performed in some ordered manner so that multiple user group identifiers cannot be positioned differently within a composite identifier from one to the next. Concatenation in an ordered manner is known or should be apparent to the relevant public and therefore need not be described herein in any detail. More generally, although the present invention is disclosed herein in terms of concatenating user group identifiers to form a composite identifier as a cache key, other methods of forming a cache key may also be employed without departing from the spirit and scope of the present invention as long as the formed cache key represents an exact same access right as between two equivalent users sharing the exact same user groups. As may now be appreciated, by employing ordered concatenation or some other equivalent function, each cache key is unique for each set of equivalent users, and thus is guaranteed to be the same for each user in a given set of equivalent users.

At this point, the network interface 22 has the cache key from the CMS 12 and may now employ same to determine whether the page 16 requested by the user at step 301 is present in the cache 24. In particular, based on each page 16 being stored in the cache along with a cache key such as that which was generated by the CMS 12 at step 317, the network interface 22 searches the cache 24 for any page 16 that satisfies the request and that is stored in the cache 24 with the cache key that was generated by the CMS 12 at step 317 (step 319). Note that any page 16 in the cache 24 that satisfies the request should have a cache identifier corresponding to the page 16 as requested by the user.

Presuming for the moment that no page 16 within the cache 24 in fact has the cache key of step 317, the network interface 22 cannot return any page 16 from the cache 24 in response to the request from the user. Accordingly, the network interface 22 forwards the request from the user for the page 16 to the CMS 12 (step 321), and the CMS 12 appropriately generates the requested page 16 based on generating information in the content database 20 and returns the generated page 16 to the network interface 22 (step 323). The network interface 22 may then further return the generated page 16 to the requesting user (step 327). In addition, and as may now be appreciated, the network interface 22 stores the generated page 16 in the cache 24 along with the cache key returned by the CMS 12 at step 317 (step 325).

Accordingly, if after the original user another user requests the same page, as at step 301, and if the another user has the exact same access rights as the original user, i.e., is a member of the exact same user groups as the original user, then the response to the request proceeds as follows.

As before, in response to the request, the network interface 22 may perform preliminary functions such as authenticating the request at step 303 and determining in conjunction with the CMS 12 that the another user is authorized to make the request as at steps 305–309. Here, when the CMS 12 logs the another user thereinto as at step 311, and again presuming the another user has the exact same access rights as the original user, the CMS 12 will determine at step 313 the exact same user groups as with the original user.

Thus, when the network interface 22 requests that the CMS 12 provide a cache key corresponding to the logged-in another user as at step 315, the CMS 12 in response in fact generates and returns to the network interface 22 as at step 317 the exact same cache key for the logged-in another user as compared with the cache key generated for the original user, signifying that both the original user and the another user have the exact same access rights.

As may now be appreciated, the network interface 22 with the exact same cache key from the CMS 12 searches the cache 24 for any page 16 with such cache key as at step 319. Here, of course, such a page 16 within the cache 24 in fact has the cache key, unless for some reason the page 16 was removed, which is presumed not to be the case. Accordingly, the network interface 22 retrieves such page 16 from the cache 24 (step 329) and returns such retrieved page 16 to the user as at step 327.

Notably, in the present invention, and in cases where a page 16 is already cached, the network interface 22 need not contact the CMS 12 to generate the page as at steps 321 and 323, and resources associated with such functions are not expended. Moreover, since each cache key is based on all of the user groups that the requesting user is a member of, no request can result in the exact same cache key as a previous request being generated unless the requesting user is a member of the exact same user groups as the previous request, no more and no less, thus signifying that the user of the request has the exact same access rights as the user of the previous request and is therefore an 'equivalent' user to such previous user.

CONCLUSION

Although the present invention is disclosed primarily in terms of the CMS 12, it is to be appreciated that such invention can be used by any other system that serves computationally intensive content, authenticates users, grants rights to content within the system based on access rights of the authenticated user, and has content which can differ based on the rights of the authenticated user requesting the content. Accordingly, the present invention should not be limited to use in connection with the CMS 12, but should be interpreted to be employable by any such other system as well.

The programming necessary to effectuate the processes performed and structures created in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful CMS system 10 or other system that caches a page 16 based on the access rights a user has with regard to the page 16, whereby such rights are exemplified by membership of the user in one or more user groups or the like. It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

What is claimed is:

1. A method for serving data from a data source to a user by way of an interface having a cache, the data source having a plurality of pre-defined user groups, the method comprising:

the interface receiving a request from the user for the data from the data source;

the interface requesting the data source to provide a cache key corresponding to the requesting user;

the data source generating the cache key for the requesting user based on a set of the user groups of such user and returning the generated cache key to the interface, the generated cache key representing exact access rights for the user based on the set of the user groups of the user; and the interface determining whether any data that satisfies the request is stored in the cache with the generated cache key, whereby the generated cache key is unique for any set of equivalent users and generated for each user in a given set of equivalent users.

2. The method of claim 1 for serving a page from a content management server (CMS), the CMS having the plurality of pre-defined user groups, the method comprising:

the interface receiving a request from the user for the page from the CMS;

the interface requesting the CMS to provide the cache key corresponding to the requesting user;

the CMS generating the cache key for the requesting user based on the set of the user groups of such user and returning the generated cache key to the interface; and the interface determining whether any page that satisfies the request is stored in the cache with the generated cache key.

3. The method of claim 1 wherein if the interface determines that no data that satisfies the request is stored in the cache with the generated cache key:

the interface forwards the request for the data to the data source;

the data source generates the requested data and returns same to the interface;

the interface stores the generated data in the cache along with the generated cache key; and the interface returns the generated data to the requesting user.

4. The method of claim 1 wherein if the interface determines that data that satisfies the request is in fact stored in the cache with the generated cache key:

the interface retrieves the data from the cache; and the interface returns the retrieved data to the requesting user.

5. The method of claim 1 further comprising:

the interface and the data source in conjunction determining that the user is authorized to be served the data by:

the interface:

identifying the user from the request;

notifying the data source that the identified user has requested the data; and receiving authorization from the data source to honor the request;

and the data source:

logging the user thereinto; and determining the set of pre-defined user groups that the user belongs to.

6. The method of claim 1 wherein the data source in authorizing the request for the data locates access rights specified for the data and determines based on the user groups that the user belongs to whether such user satisfies such access rights.

7. The method of claim 1 wherein each user group of the user in the set of user groups has an identifier and the data source generates the cache key to represent all of the identifiers of the user groups.

8. The method of claim 7 wherein the data source concatenates all of the identifiers into the cache key.

9. The method of claim 8 herein the data source concatenates all of the identifiers into the cache key in an ordered manner.

10. A method for serving data from a data source to a user by way of an interface having a cache, the data source having a plurality of pre-defined user groups, the method comprising:

the interface receiving a request from the user for the data from the data source;

the interface requesting the data source to provide a cache key corresponding to the requesting user, whereby the data source generates the cache key for the requesting user based on a set of the user groups of such user;

the interface receiving the generated cache key from the data source, the generated cache key representing exact access rights for the user based on the set of the user groups of the user; and the interface determining whether any data that satisfies the request is stored in the cache with the generated cache key.

11. The method of claim 10 for serving a page from a content management server (CMS), the CMS having the plurality of pre-defined user groups, the method comprising:

the interface receiving a request from the user for the page from the CMS;

the interface requesting the CMS to provide the cache key corresponding to the requesting user, whereby the CMS generates the cache key for the requesting user based on the set of the user groups of such user;

the interface receiving the generated cache key from the CMS; and the interface determining whether any page that satisfies the request is stored in the cache with the generated cache key.

12. The method of claim 10 wherein if the interface determines that no data that satisfies the request is stored in the cache with the generated cache key:

the interface forwards the request for the data to the data source, whereby the data source generates the requested data;

the interface receives the generated data from the data source;

the interface stores the generated data in the cache along with the generated cache key; and the interface returns the generated data to the requesting user.

13. The method of claim 10 wherein if the interface determines that data that satisfies the request is in fact stored in the cache with the generated cache key:

the interface retrieves the data from the cache; and the interface returns the retrieved data to the requesting user.

14. The method of claim 10 further comprising the interface determining that the user is authorized to be served the data by:

identifying the user from the request;

notifying the data source that the identified user has requested the data; and receiving authorization from the data source to honor the request, whereby the data source logs the user thereinto and determines the set of pre-defined user groups that the user belongs to.

15. A computer-readable medium having computer-executable instructions stored thereon for implementing a method for serving data from a data source to a user by way of an interface having a cache, the data source having a plurality of pre-defined user groups, the method comprising:

the interface receiving a request from the user for the data from the data source;

the interface requesting the data source to provide a cache key corresponding to the requesting user, whereby the data source generates the cache key for the requesting user based on a set of the user groups of such user;

the interface receiving the generated cache key from the data source, the generated cache key representing exact access rights for the user based on the set of the user groups of the user; and the interface determining whether any data that satisfies the request is stored in the cache with the generated cache key.

16. The medium of claim 15 for serving a page from a content management server (CMS), the CMS having the plurality of pre-defined user groups, the method comprising:

the interface receiving a request from the user for the page from the CMS;

the interface requesting the CMS to provide the cache key corresponding to the requesting user, whereby the CMS generates the cache key for the requesting user based on the set of the user groups of such user;

the interface receiving the generated cache key from the CMS; and the interface determining whether any page that satisfies the request is stored in the cache with the generated cache key.

17. The medium of claim 15 wherein the method comprises, if the interface determines that no data that satisfies the request is stored in the cache with the generated cache key:

the interface forwarding the request for the data to the data source, whereby the data source generates the requested data;

the interface receiving the generated data from the data source;

the interface storing the generated data in the cache along with the generated cache key; and the interface returning the generated data to the requesting user.

18. The method of claim 15 wherein the method comprises, if the interface determines that data that satisfies the request is in fact stored in the cache with the generated cache key:

the interface retrieving the data from the cache; and the interface returning the retrieved data to the requesting user.

19. The medium of claim 15 wherein the method further comprises the interface determining that the user is authorized to be served the data by:

identifying the user from the request;

notifying the data source that the identified user has requested the data; and receiving authorization from the data source to honor the request, whereby the data source logs the user thereinto and determines the set of pre-defined user groups that the user belongs to.

* * * * *